(12) United States Patent
Pan et al.

(10) Patent No.: US 8,639,797 B1
(45) Date of Patent: Jan. 28, 2014

(54) NETWORK MONITORING OF BEHAVIOR PROBABILITY DENSITY

(75) Inventors: Xiaohong Pan, Fremont, CA (US); Kishor Kakatkar, Santa Clara, CA (US); Derek Sanders, Saratoga, CA (US); Rangaswamy Jagannathan, Sunnyvale, CA (US); Jing Liu, Cupertino, CA (US); Rosanna Lee, Palo Alto, CA (US)

(73) Assignee: Xangati, Inc., Cupertino, CA (US)

( * ) Notice: Subject to any disclaimer, the term of this patent is extended or adjusted under 35 U.S.C. 154(b) by 284 days.

(21) Appl. No.: 12/180,243

(22) Filed: Jul. 25, 2008

Related U.S. Application Data

(60) Provisional application No. 60/963,233, filed on Aug. 3, 2007, provisional application No. 60/963,229, filed on Aug. 3, 2007, provisional application No. 60/963,226, filed on Aug. 3, 2007.

(51) Int. Cl.
*G06F 15/173* (2006.01)

(52) U.S. Cl.
USPC ............ 709/224; 709/223; 709/225; 709/226

(58) Field of Classification Search
USPC ................................................. 709/223–226
See application file for complete search history.

(56) References Cited

U.S. PATENT DOCUMENTS

| | | | |
|---|---|---|---|
| 5,128,871 A | 7/1992 | Schmitz | |
| 5,233,604 A | 8/1993 | Ahmadi et al. | |
| 5,271,038 A * | 12/1993 | Cai | ............................... 375/317 |
| 5,430,709 A | 7/1995 | Galloway | |
| 5,442,750 A | 8/1995 | Harriman et al. | |
| 5,917,870 A | 6/1999 | Wolf | |
| 5,958,053 A | 9/1999 | Denker | |
| 5,970,064 A | 10/1999 | Clark et al. | |
| 5,991,881 A | 11/1999 | Conklin et al. | |
| 6,046,979 A | 4/2000 | Bauman | |
| 6,076,115 A | 6/2000 | Sambamurthy et al. | |
| 6,115,745 A | 9/2000 | Berstis et al. | |
| 6,167,025 A | 12/2000 | Hsing et al. | |
| 6,189,035 B1 | 2/2001 | Lockhart et al. | |
| 6,202,084 B1 | 3/2001 | Kumar et al. | |
| 6,314,093 B1 | 11/2001 | Mann et al. | |
| 6,314,464 B1 | 11/2001 | Murata et al. | |

(Continued)

OTHER PUBLICATIONS

Deering et al. "RFC1883," Internet Protocol Specification, Dec. 1995, pp. 1-27, ver. 6, <http://www.faqs.org/rfcs/rfc1883.html>.

(Continued)

*Primary Examiner* — Duyen Doan
(74) *Attorney, Agent, or Firm* — Dorsey & Whitney LLP

(57) ABSTRACT

A network monitoring system maintains both information regarding historical activity of a network, and information regarding emergent activity of the network. Comparison of historical activity of the network with emergent activity of the network allows the system to determine whether network activity is changing over time. The network monitoring system maintains data structures representing a p.d.f. for observable values of network parameters. Recent activity of the network can be compared with both the p.d.f. for historical activity and for emergent activity to aid in determining whether that recent activity is within the realm of normal, and whether network activity is changing over time. The network monitoring system adjusts that information regarding historical activity of a network in response to emergent activity of that network. The network monitoring device determines information regarding time-dependent activity of that network in response to spectral analysis regarding historical activity of that network.

22 Claims, 4 Drawing Sheets

(56) References Cited

U.S. PATENT DOCUMENTS

| | | | |
|---|---|---|---|
| 6,321,338 B1 * | 11/2001 | Porras et al. | 726/25 |
| 6,347,339 B1 | 2/2002 | Morris et al. | |
| 6,502,135 B1 | 12/2002 | Minger et al. | |
| 6,529,866 B1 * | 3/2003 | Cope et al. | 704/205 |
| 6,725,377 B1 | 4/2004 | Kouznetsov | |
| 6,757,742 B1 | 6/2004 | Viswanath | |
| 6,785,237 B1 | 8/2004 | Sufleta | |
| 6,789,190 B1 | 9/2004 | Cohen | |
| 6,816,910 B1 | 11/2004 | Riciulli | |
| 6,930,978 B2 | 8/2005 | Sharp et al. | |
| 6,973,040 B1 | 12/2005 | Ricciulli | |
| 6,990,591 B1 | 1/2006 | Pearson | |
| 7,007,301 B2 | 2/2006 | Crosbie et al. | |
| 7,013,482 B1 | 3/2006 | Krumel | |
| 7,051,369 B1 | 5/2006 | Baba | |
| 7,062,782 B1 | 6/2006 | Stone et al. | |
| 7,076,547 B1 | 7/2006 | Black | |
| 7,089,428 B2 | 8/2006 | Farley et al. | |
| 7,260,840 B2 | 8/2007 | Swander et al. | |
| 7,331,060 B1 | 2/2008 | Ricciulli | |
| 7,386,888 B2 | 6/2008 | Liang et al. | |
| 7,409,714 B2 | 8/2008 | Gupta et al. | |
| 7,461,403 B1 | 12/2008 | Libenzi et al. | |
| 7,506,046 B2 * | 3/2009 | Rhodes | 709/224 |
| 7,519,705 B1 * | 4/2009 | Papagiannaki et al. | 709/224 |
| 7,594,260 B2 * | 9/2009 | Porras et al. | 726/13 |
| 7,607,170 B2 * | 10/2009 | Chesla | 726/22 |
| 7,620,986 B1 | 11/2009 | Jagannathan et al. | |
| 7,702,563 B2 | 4/2010 | Balson et al. | |
| 2001/0049711 A1 | 12/2001 | Nishihara | |
| 2001/0052087 A1 * | 12/2001 | Garg et al. | 714/37 |
| 2002/0052967 A1 | 5/2002 | Goldhor et al. | |
| 2003/0229485 A1 | 12/2003 | Nishikawa et al. | |
| 2003/0229692 A1 | 12/2003 | Vo | |
| 2004/0054925 A1 | 3/2004 | Etheridge et al. | |
| 2004/0064293 A1 * | 4/2004 | Hamilton et al. | 702/182 |
| 2005/0044406 A1 * | 2/2005 | Stute | 713/201 |
| 2005/0190695 A1 | 9/2005 | Phaal et al. | |
| 2005/0213504 A1 | 9/2005 | Enomoto | |
| 2005/0276230 A1 | 12/2005 | Akahane et al. | |
| 2005/0278779 A1 | 12/2005 | Koppol et al. | |
| 2006/0059282 A1 | 3/2006 | Chaudhary et al. | |
| 2006/0077905 A1 | 4/2006 | Russell et al. | |
| 2006/0109793 A1 | 5/2006 | Kim et al. | |
| 2006/0195896 A1 | 8/2006 | Fulp et al. | |
| 2006/0242694 A1 * | 10/2006 | Gold et al. | 726/13 |
| 2006/0272018 A1 | 11/2006 | Fouant | |
| 2007/0025528 A1 * | 2/2007 | Knott et al. | 379/32.01 |
| 2007/0156919 A1 | 7/2007 | Potti et al. | |
| 2007/0195787 A1 | 8/2007 | Alnuweiri et al. | |
| 2007/0211697 A1 | 9/2007 | Noble | |
| 2008/0291915 A1 | 11/2008 | Foschiano | |
| 2009/0046664 A1 | 2/2009 | Aso | |
| 2010/0135180 A1 | 6/2010 | Morinaga et al. | |
| 2011/0040706 A1 | 2/2011 | Sen et al. | |

OTHER PUBLICATIONS

Steinke. "IP Addresses and Subnet Masks," Network Magazine, Oct. 1995, pp. 1-3, Tables 1 and 3, <http://www.networkmagazine.com/shared/printableArticle.jhtml?articleID=17601068>.

* cited by examiner

| Ranking | Frequency | Term |
|---|---|---|
| 1 | 0 | constant |
| 2 | 28 | daily |
| 3 | 4 | weekly |
| 4 | 56 | |
| 5 | 8 | |
| 6 | 32 | |
| 7 | 1 | |
| 8 | 24 | |

NETWORK MONITORING OF BEHAVIOR PROBABILITY DENSITY

CROSS-REFERENCE TO RELATED DOCUMENTS

This application claims priority of, the following related documents:

U.S. Provisional Patent Application 60/963,233, filed Aug. 3, 2007, titled "Network Monitoring of Behavior Probability Density", Express Mail mailing number EV 875 991 972 US.

U.S. Provisional Patent Application 60/963,229, filed Aug. 3, 2007, titled "Continuous Adaptive Monitoring of Network Behavior", Express Mail mailing number EV 875 991 990 US.

U.S. Provisional Patent Application 60/963,226, filed Aug. 3, 2007, titled "Spectral Analysis of Periodicity in Network Behavior", Express Mail mailing number EV 875 992 006 US.

Each of these documents is hereby incorporated by reference as if fully set forth herein. These documents are sometimes referred to herein as the "incorporated disclosures".

BACKGROUND

One known problem when monitoring network activity is that of distinguishing between normal network activity and abnormal network activity. Short-term network activity might represent abnormal activity, might represent a change in normal network activity, or might represent a short-term deviation from normal activity that is itself not problematic. This has the effect that it might become difficult for a network monitoring device to reliably distinguish between those types of network activity that are normal and those types of network activity that are not.

SUMMARY

A network monitoring system maintains both (1) information regarding historical activity of a network, e.g., in response to a relatively long-term review of network behavior, and (2) information regarding emergent activity of the network, e.g., in response to a relatively short-term review of network behavior. Comparison of historical activity of the network with emergent activity of the network allows the network monitoring system to determine whether network activity is changing over time.

The network monitoring system adjusts that information regarding emergent activity of that network in response to information regarding recent activity of that network, so long as that recent activity of that network falls within the realm of normal behavior of that network. From time to time, that information regarding historical activity of the network is adaptively modified in response to information regarding emergent activity of that network.

The network monitoring system adjusts that information regarding historical activity of a network in response to emergent activity of that network. The network monitoring device determines information regarding time-dependent activity of that network, e.g., periodicity of network activity, in response to spectral analysis of that information regarding historical activity of that network.

The network monitoring system may maintain data structures representing a p.d.f. (probability density function) for observable values of network parameters. Such data structures can be maintained both for historical activity of the network and for emergent activity of the network. Recent activity of the network can be compared with both the p.d.f. for historical activity and for emergent activity to aid in determining whether that recent activity is within the realm of normal, and whether network activity is changing over time.

DETAILED DESCRIPTION

This application should be read in its most general form, including, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.

References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

TERMS AND PHRASES

This application should be read with the following terms and phrases in their most general form. The general meaning of each of these terms or phrases is illustrative, not in any way limiting.

The phrase "network monitoring system", and the like, generally refers to any apparatus or method by which information relating to network traffic is identified or reported. The phrase "network monitoring device", and the like, generally refers to any apparatus included in a network monitoring system.

The phrases "network activity", "network behavior", and the like, generally refer to any information relating to status of a network of processing devices. The phrase "network traffic", and the like, generally refers to any information relating to communication in a network of processing devices.

The phrase "historical activity", and the like, generally refers to any information responsive to a relatively long-term review of network activity.

The phrase "emergent activity", and the like, generally refers to any information responsive to a relatively short-term review of network activity.

The phrase "recent activity", and the like, generally refers to any information responsive to a relatively recent review of network activity.

The terms "p.d.f." and "probability density function", and the like, generally refer to any information relating to an observed or observable distribution of possible network behavior.

Figure 1:
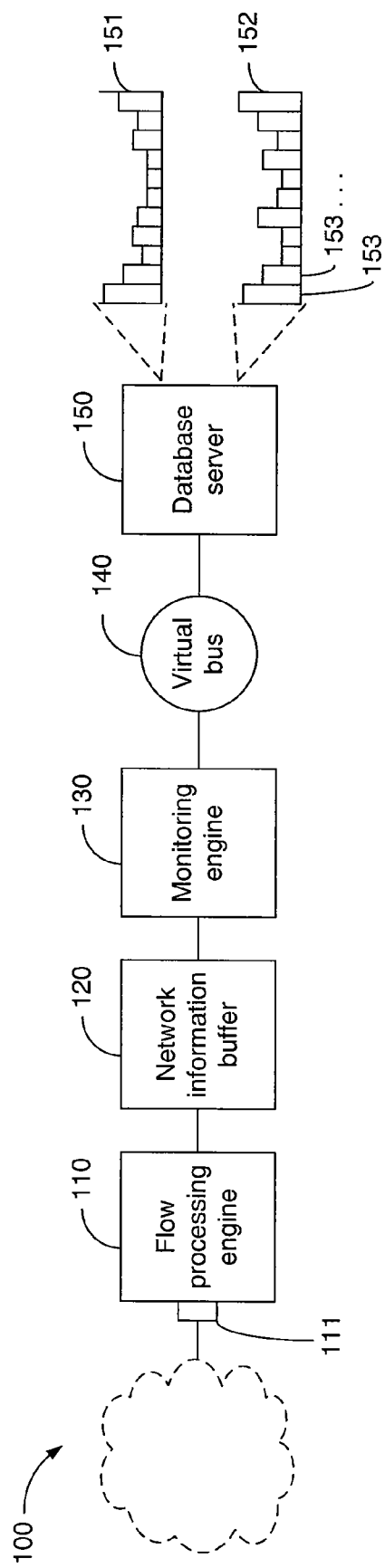
FIG. 1 shows a block diagram of an embodiment of a system of the present invention.

Referring initially to FIG. 1, a network monitoring system 100 includes elements as shown in the FIG. 1, including at least: a flow processing engine 110 (coupled to a communication network), a network information buffer 120, a monitoring engine 130, a virtual bus 140, and a database server 150.

The communication network might include any form of communication pathway, such as, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The flow processing engine 110 includes an input port 111, coupled to the communication network, capable of receiving information from the network regarding communication flows within that network. Such information regarding communication flows might be received from one or more network routers or other traffic reporting devices, as further described in the incorporated disclosures. While this description includes embodiments in which the flow processing engine 110 receives information regarding communication flows, in the context of the invention, there is no particular requirement to so limit the flow processing engine 110 or the invention. For example, the network monitoring system 100 might alternatively operate using information regarding actual network packet traffic, or other information suitable for the operations described herein.

The network information buffer 120 is coupled to an output of the flow processing engine 110, and is capable of receiving network information relating to activity of the communication network. In one embodiment, that network information includes a set of virtual packets, as further described in the incorporated disclosures. While this description includes embodiments in which the network information buffer 120 receives a set of virtual packets, in the context of the invention, there is no particular requirement to so limit the network information buffer 120 or the invention. For example, the network monitoring system 100 might alternatively operate using other information suitable for the operations described herein.

The monitoring engine 130 reads information from the network information buffer 120 and determines substantially instantaneous values for observable values of network parameters.

In one embodiment, these observable values include a bit rate (expressed in bits per second, or an equivalent thereof), a packet rate (expressed in packets per second, or an equivalent thereof), a communication density (expressed as number of concurrent communication partners, or an equivalent thereof), and a communication burstiness (expressed as a change in bit rate, or an equivalent thereof). While this description includes embodiments with regard to these particular observable parameters, in the context of the invention, there is no particular requirement to so limit the monitoring engine 130 or the invention. For example, the network monitoring system 100 might alternatively operate using a first or second derivative of any of these parameters, or other information suitable for the operations described herein.

The virtual bus 140 provides for communication among elements of the network monitoring system 100, such as elements shown in the FIG. 1, including at least: the monitoring engine 130 and the database server 150. Such communication might be conducted using a set of subscription channels, as further described in the incorporated disclosures. While this description includes embodiments in which communication uses subscription channels, in the context of the invention, there is no particular requirement to so limit the virtual bus 140 or the invention. For example, the network monitoring system 100 might alternatively operate using a blackboard communication system, interprocess communication, or other techniques suitable for the operations described herein.

The database server 150 maintains a database of information for use by elements of the network monitoring system 100. The database server 150 includes elements as shown in the FIG. 1, including at least: an historical histogram 151 regarding historical activity of the network, an emergent histogram 152 regarding emergent activity of the network.

The historical histogram 151 and the emergent histogram 152 each include a set of buckets 153, disposed in a sequential order for observable values of a parameter relating to network activity, and may be marked with a timestamp indicating at what time those observable values were detected, and include a set of time-stamped bins, each marked with a selected time offset from a beginning of a selected time duration. For example, where that parameter includes a bit rate, the set of buckets 153 might include a $1^{st}$ bucket 153 for less than $10^1$ bits per second, a $2^{nd}$ bucket 153 for at least $10^1$ bits per second but less than $10^2$ bits per second, a $3^{rd}$ bucket 153 for at least $10^2$ bits per second but less than $10^3$ bits per second, a $4^{th}$ bucket 153 for at least $10^3$ bits per second but less than $10^4$ bits per second, a $5^{th}$ bucket 153 for at least $10^4$ bits per second but less than $10^5$ bits per second, a $6^{th}$ bucket 153 for at least $10^5$ bits per second but less than $10^6$ bits per second, a $7^{th}$ bucket 153 for at least $10^6$ bits per second but less than $10^7$ bits per second, and an $8^{th}$ bucket 153 for at least $10^7$ bits per second.

While this description includes embodiments in which there are this particular number of buckets and in which the buckets are have an exponentially distributed size, in the context of the invention, there is no particular requirement that buckets 153 or the invention should be so limited. For example, the network monitoring system 100 might alternatively operate using a different number of buckets 153, a Gaussian or other distinct distribution of sizes for those buckets 153, a different set of data for those buckets 153, or other information suitable for the operations described herein.

In each bucket 153, the database server 150 maintains a count of an observed set of values as reported by the monitoring engine 130. This has the effect that the historical histogram 151 and the emergent histogram 152 each represent observed activity of the network, with more frequent activity being represented by buckets 153 having a larger count of their respective observed set of values and with less frequent activity being represented by buckets 153 having a smaller count of their respective observed set of values. This has the effect that the historical histogram 151 and the emergent histogram 152 each represent a p.d.f. (probability distribution function) of network activity.

While this description includes embodiments in which the historical histogram 151 and the emergent histogram 152 each represent a p.d.f. (probability distribution function) of network activity, in the context of the invention, there is no particular requirement that the historical histogram 151 and the emergent histogram 152, or the invention, should be so limited. For example, the network monitoring system 100 might alternatively operate using a histogram representing other information, such as for example a cumulative probably distribution function, or other information suitable for the operations described herein.

The historical histogram 151 represents observed historical activity of the network, i.e., information responsive to a relatively long-term review of network activity. The emergent histogram 152 represents observed emergent activity of the network, i.e. information responsive to a relatively short-term review of network activity. This has the effect that, should the nature of network activity change, that change will first be reflected in the emergent histogram 152, and only later be reflected in the historical histogram 151. This has the effect that any significant differences between the emergent histogram 152 and the historical histogram 151 can be used to detect any significant changes in the nature of network activity. Accordingly, from time to time, the historical histogram 151 is adjusted to reflect changes in the emergent histogram 152.

This also has the effect that recent network activity can be compared both with the historical histogram 151 and with the emergent histogram 152. Should recent network activity differ significantly from the historical histogram 151, this might indicate relatively unusual network activity. Should recent network activity differs significantly from the emergent histogram 152, this might indicate relatively unusual network activity, or might alternatively indicate the occurrence of changes in the nature of network activity.

Accordingly, the network monitoring device 100 compares recent network activity with the historical histogram 151 to determine whether that recent network activity is relatively unusual. The network monitoring device 100 compares recent network activity with the emergent histogram 152 to determine whether that recent network activity indicates an ongoing change in the nature of network activity.

This has the effect that, so long as the emergent histogram 152 is consistent with the historical histogram 151, any recent network activity that differs from the emergent histogram 152 would indicate an ongoing change in the nature of network activity. In contrast, the emergent histogram 152 might be inconsistent with the historical histogram 151, in which case any recent network activity would be reflected in the emergent histogram 152, with the effect that any ongoing change in the nature of network activity would become reflected in the emergent histogram 152.

Figure 2:
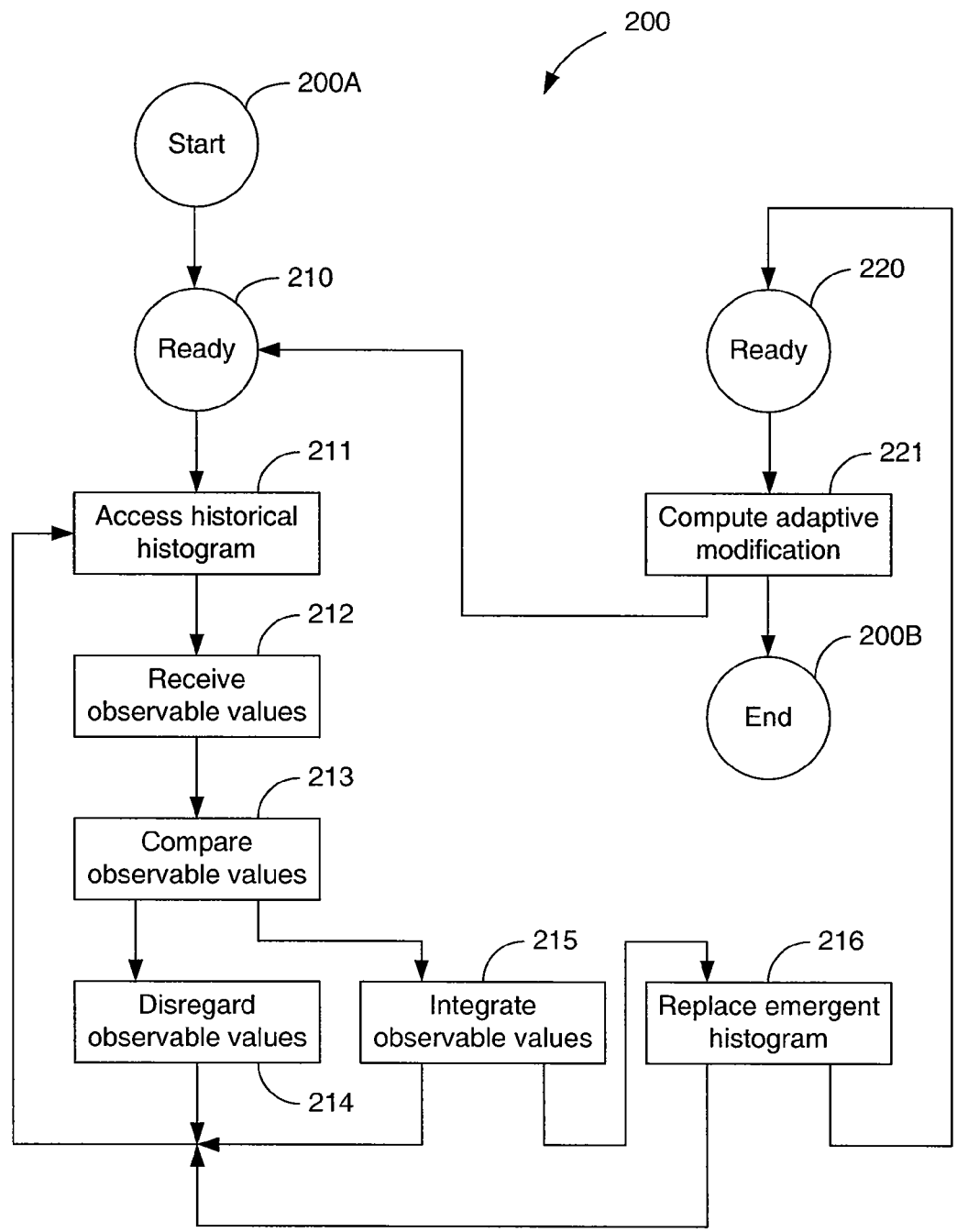
FIG. 2 shows a conceptual view of a process flow in a method.

Referring to FIG. 2, a method 200 of flow markers and process steps is illustrated and described as follows:

A flow marker 200A indicates a beginning of the method 200. Although described sequentially, the flow markers and process steps shown with regard to the method 200 may be performed concurrently, in parallel, pipelined, or otherwise, with the effect that those flow markers and process steps might be performed substantially simultaneously with respect to distinct data.

The method 200 proceeds with the flow marker 210. A flow marker 210 indicates that the method 200 is ready to compute histograms.

At a step 211, the network monitoring system 100 has access to an historical histogram 151, a "last known good" emergent histogram 152 (sometimes referred to herein as 152a), and an "in construction" emergent histogram 152 (sometimes referred to herein as 152b). The historical histogram 151 includes a set of acceptable observable values, and a set of threshold values indicating how far from the acceptable observable values actual recent network activity may stray without being regarded as abnormal network activity.

At a step 212, the network monitoring system 100 receives substantially instantaneous values for observable values of network parameters. In one embodiment, as described above, these observable values can be read from the virtual bus 140 or from the database server 150.

At a step 213, the network monitoring system 100 compares the observable values, received in the previous step 212, with the historical histogram 151. If the observable values are inconsistent with the historical histogram 151, i.e., if the observable values stray outside the set of acceptable observable values by more than the threshold values described with respect to the step 211, the network monitoring system 100 concludes that the observable values represent abnormal network activity.

If the network monitoring system 100 concludes that the observable values from recent network activity represent abnormal network activity, the method 200 proceeds with the next step 214, at which step those observable values from recent network activity can be disregarded, along with the "in construction" emergent histogram 152b.

If the network monitoring system 100 concludes that the observable values from recent network activity represent normal network activity, any method 200 skips the next step 214, and proceeds with the step 215, at which step the observable values from recent network activity can be integrated into the "in construction" emergent histogram 152b.

At a step 214, the network monitoring system 100 replaces the "in construction" emergent histogram 152b with the "last known good" emergent histogram 152a. The method 200 waits for a selected time duration, for network activity to return to normal, after which the method 200 proceeds with the step 211.

At a step 215, the network monitoring system 100 integrates the observable values from recent network activity into the "in construction" emergent histogram 152b. In one embodiment, the network monitoring system 100 computes an exponential moving average for each bucket 153 and the "in construction" emergent histogram 152b, i.e., the network monitoring system 100 computes an exponential moving average of the previously-recorded value for each bucket 153 and a new value associated with the observable values for that same bucket 153, and replaces the recorded value in that same bucket 153 with the new exponential moving average.

The network monitoring system 100 computes the "in construction" emergent histogram 152b, using the exponential moving average as described in the previous step 215, for a first selected time duration. During that first selected time duration, the network monitoring system 100 repeats the step 211, the step 212, the step 213, and the step 215, so long as the observable values remain within what the network monitoring system 100 considers normal network activity. After that first selected time duration, the network monitoring system 100 pauses its computation of the exponential moving average, and executes the following step 216.

At a step 216, the network monitoring system 100 replaces the "last known good" emergent histogram 152a with the values computed in the "in construction" emergent histogram 152b. This has the effect of preserving the computed exponential moving average recorded in the "in construction" emergent histogram 152b as the new "last known good" emergent histogram 152a.

After preserving the computed exponential moving average by replacing the "last known good" emergent histogram 152a with the "in construction" emergent histogram 152b, the method 200 proceeds with the step 211, to continue adjusting the emergent histogram 152.

A flow marker 220 indicates that the method 200 is ready to compute historical histograms. The network monitoring system 100 maintains the "last known good" emergent histogram 152a, for a second selected time duration. During that second selected time duration, the network monitoring system 100 repeats the step 211, the step 212, the step 213, the step 215, and the step 216, so long as the observable values remain within what the network monitoring system 100 considers normal network activity. After that second selected time duration, the network monitoring system 100 pauses its maintenance of the "last known good" emergent histogram 152a, and executes the following step 221.

At a step 221, the network monitoring system 100 computes an adaptive modification of the historical histogram 151, in response to the "last known good" emergent histogram 152a. To perform this step, the network monitoring system 100 computes a new value for each bucket 153 of the historical histogram 151, as follows:

(historical bucket value)$_{new}$=$\lambda$(historical bucket value)$_{old}$+(1−$\lambda$)("last known good" bucket value)$_{new}$ In one embodiment, the parameter $\lambda$ might equal approximately 0.8, i.e., 80% (i.e., $\lambda$) of the old historical bucket value is maintained and 20% (i.e., 1−$\lambda$) of the emergent bucket value is substituted.

After adaptively modifying the historical histogram 151, the method 200 proceeds with the flow marker 210, to continue adjusting the emergent histogram 152.

A flow marker 200B indicates an end of the method 200.

Figure 3:
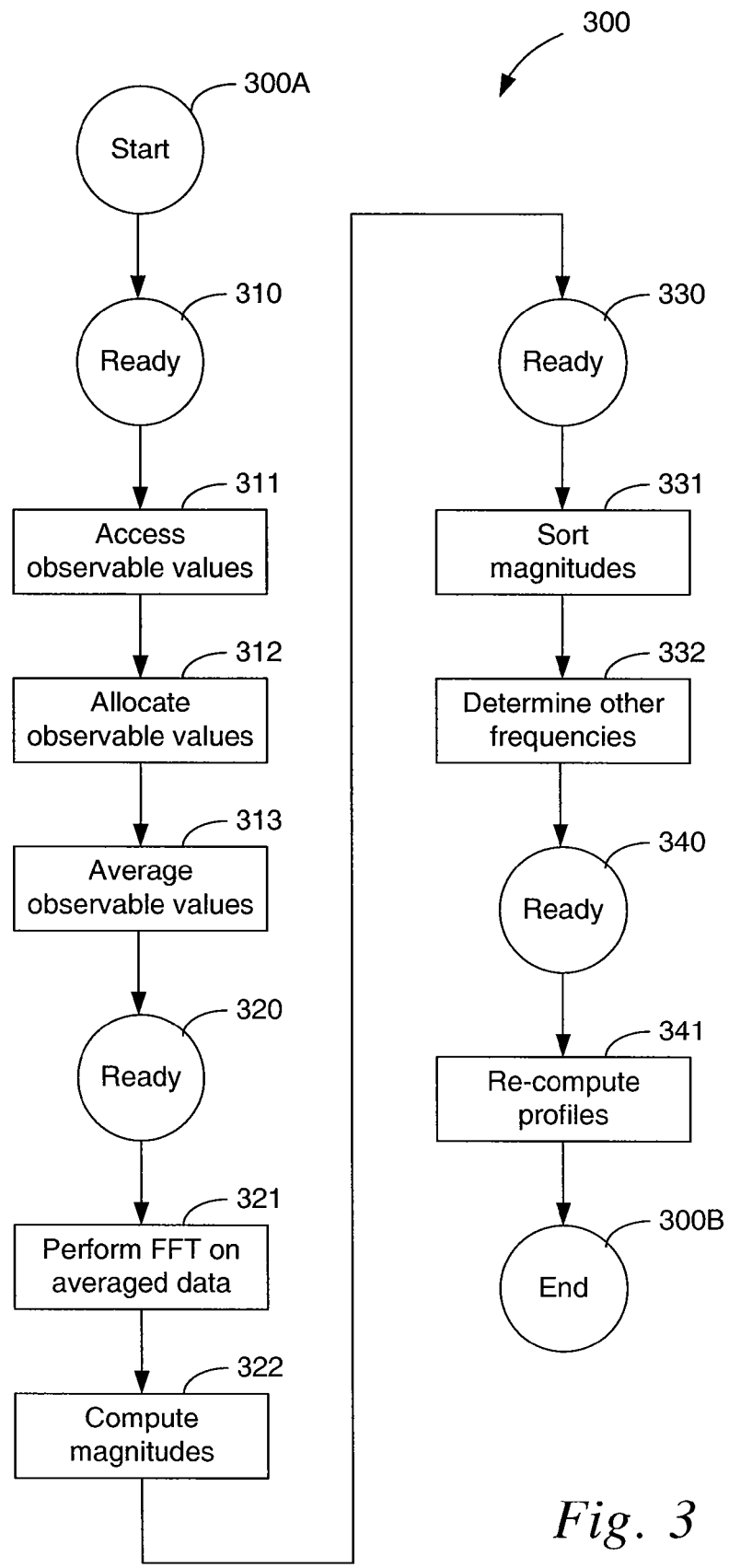
FIG. 3 shows a conceptual view of another process flow in a method.

Referring to FIG. 3, a conceptual diagram of a process flow in a method is illustrated and described as follows:

A flow marker 300A indicates a beginning of the method 300. Although described sequentially, the flow markers and process steps shown with regard to the method 300 may be performed concurrently, in parallel, pipelined, or otherwise, with the effect that those flow markers and process steps might be performed substantially simultaneously with respect to distinct data.

The method 300 proceeds with the flow marker 310. A flow marker 310 indicates that the method 300 is ready to average time-dependent observations.

At a step 311, the network monitoring system 100 has access to the set of substantially instantaneous values for observable values of network parameters, each marked with a timestamp indicating at what time those observable values were detected. At this step, the network monitoring system 100 also has access to the set of time-stamped bins, each marked with a selected time offset from a beginning of a selected time duration.

At a step 312, the network monitoring system 100 allocates the set of substantially instantaneous values for observable values of network parameters, each to an associated time-stamped bin. This has the effect that all time-stamped observations preferably are allocated to an associated time-stamped bin matching the offset of that time-stamped observation from the beginning of a selected time duration.

In one embodiment, the selected time duration should be at least about four weeks, with the effect that time-dependent patterns in the observable values can be readily detected.

In one embodiment, the selected number of time-stamped bins should be a power of two, with the effect that an FFT (Fast Fourier Transform) can readily be performed for the data maintained in those time-stamped bins.

At a step 313, the network monitoring system 100 averages the observable values for each time-stamped bin. This has the effect that multiple observable values, each allocated to a common time-stamped bin, preferably are averaged to produce a single value associated with that time-stamped bin, i.e., associated with the offset of that time-stamped bin with respect to the selected time duration.

For one example, when examining a set of observable values occurring over a selected time duration of four weeks, and when allocating those observable values to a set of 8,192 ($2^{13}$) separate time-stamped bins, each such time-stamped bin would have an allocated duration of approximately 295.31 seconds. For each such time-stamped bin, the network monitoring system 100 averages all observable values whose timestamp falls into that common bin. Where those observable values include bit rate information, those bit rates can be averaged within each time-stamped bin.

The method 300 proceeds with the flow marker 320. A flow marker 320 indicates that the method 300 is ready to perform an FFT (Fast Fourier Transform).

At a step 321, the network monitoring system 100 performs an FFT operation on the averaged data that was computed for each time-stamped bin. This has the effect of producing a sequence of complex number values, each representing a coefficient of a sine wave or cosine wave from transforming the (averaged) observable values from a time domain into a frequency domain.

At a step 322, the network monitoring system 100 computes a magnitude of each such complex coefficient. A magnitude of a complex coefficient can readily be computed as follows:

$\|x+yi\|=\sqrt{(x^2+y^2)}$

The method 300 proceeds with the flow marker 330. A flow marker 330 indicates that the method 300 is ready to interpret a result of the FFT (Fast Fourier Transform).

At a step 331, the network monitoring system 100 sorts the magnitudes determined for each frequency in rank order.

It is expected that the magnitude associated with a zero frequency, i.e., a DC coefficient, will be relatively largest, as (for bit rate information) this represents an average amount of bit rate traffic over time. This value is expected to be greater than zero, as bit rate is expected not to ever be negative.

At a step 332, the network monitoring system 100 determines if there are any other frequencies for which the magnitude of the frequency coefficient is substantial. For one example, the network monitoring system 100 might determine if there is are any other frequencies for which that magnitude is statistically significant above zero. If there is no such frequency, the network monitoring system 100 determines that there is no significant periodicity to the observable values. Without significant periodicity to the observable values, the method 300 proceeds with the flow marker 300B, where the method 300 ends.

If there is any such frequency for which there is significant periodicity, the method 300 proceeds with the flow marker

340. A flow marker 340 indicates that the method 300 is ready to re-computes profiles with respect to particular periodic frequencies.

At a step 341, the network monitoring system 100 re-computes a profile with respect to each particular periodic frequency. It is expected that the most common frequencies to exhibit periodicity would be daily (a frequency of 28 in a four-week data set) and weekly (a frequency of 4 in a four-week data set).

In one embodiment, the network monitoring system 100 re-computes profiles with respect to particular periodic frequencies as follows:

- Where the network monitoring system 100 detects both daily periodicity and weekly periodicity, the network monitoring system 100 re-computes profiles for a weekly time duration.
- Where the network monitoring system 100 detects daily periodicity but not weekly periodicity, the network monitoring system 100 re-computes profiles for a daily time duration.
- Where the network monitoring system 100 detects neither daily periodicity nor weekly periodicity, the network monitoring system 100 does not re-compute profiles for any periodic time duration.

A flow marker 300B indicates an end of the method 300.

Examples of Specific Applications

The following examples of specific applications illustrate some aspects of the techniques previously discussed in conjunction with other techniques. It should be understood that this application is not limited to these specific examples. Also, the steps of any methods and/or techniques described below can be performed in a different order than shown, pipelined, threaded, or in other ways. Some steps might be omitted in some applications, and additional steps may be added.

Crosspoints

The term "crosspoint" generally describes an entity which can be determined by training, creating a baseline, and eventually detecting symptoms. Four types of crosspoints are generally profiled: IDs (named network endpoints), Applications, Locations, Interfaces, and Time Periods. Both incoming and outgoing activity for each of these crosspoints may be profiled.

ID and Application crosspoints may be automatically generated using a discovery process, followed by an object creation process. The discovery process looks at flows representing packets on the network. From each flow, it extracts information corresponding to some of the original packet header information for each packet (src/dst IP address, port, and protocol), and creates a virtual packet with that information.

To generate potential ID crosspoints, the discovery process preferably keeps an exponential moving average (EMA) of the bit rate and packet rate for each IP address that it sees. If or when the EMA exceeds a certain user-defined threshold, then this IP address becomes a candidate for ID creation. If possible, a reverse DNS lookup may be used to determine the name. If successful, a name may be generated from its LDAP Owner field of the ManagedBy attribute and use the owner name instead of the DNS name. If unsuccessful, the name may be derived from its MAC address obtained via an SNMP query of the endpoint. Alternatively, the system user may declare that this area of the network is "static," in which case a name may be created using the IP address and a user-supplied suffix.

Profiling Crosspoints

Once the potential ID-base crosspoints have been generated, they preferably are written to a text file. Another process can periodically check this file and creates the ID crosspoints from it. This creation may be throttled to help prevent the system from being overwhelmed with simultaneous creation of large numbers of IDs.

To generate potential application-based crosspoints, the discovery process preferably checks the port of each virtual packet. If the port is a well-known port for a known application, or if it is a port that already has been assigned for a particular application, then traffic for that port can be accounted for in the bit rate and packet rate of the application. However, if the port is not already mapped to an application, then the discovery process can keep an EMA of the bit rate and packet rate for that port. If or when the EMA exceeds the user-defined threshold, then the port can be a candidate to become an application.

These ports that are potential applications can be written to a text file. Another process can periodically check this text file and displays these ports to the user. Users can either specify for these ports to become new application(s), or they can specify for them to join existing application(s), for example.

The location-based crosspoints can be specified by the system user in terms of subnet addresses to be included and/or ignored. The Interface-based cross-points can be discovered interfaces associated with flow data. The time period-based crosspoints can be pre-specified as particular hours of a workday or non-workday.

Rate Profiling Metrics

Current network traffic for each crosspoint can be monitored using an exponential moving average (EMA). Several metrics for each profile point preferably are continually being updated based on this EMA. These metrics, which are occasionally baselined and saved as profiles, enable the system to understand "normal" behavior for this crosspoint. The current traffic EMA may then be compared with these baselined profiles at any time to determine whether the network behavior is normal.

Two metrics that may be stored for each profile point are the minimum and maximum for four different values: packet rate, bit rate, interaction rate, and burstiness.

The packet rate and bit rate values can be the EMA values updated periodically, such as once per second for example, using the average packet rate and average bit rate for that second.

Interaction rate is a measure of how many IP addresses are actively:

- sending to or receiving from an ID profile point;
- using an application (for an application profile point);
- sending to or receiving from a location profile point;
- sending to or receiving from an Interface profile point; or
- sending or receiving traffic during that time period (for a time period profile point).

Burstiness is the rate of change of bit rate. The literature discusses several commonly used measures of traffic burstiness:

- peak-to-mean ratio,
- coefficient of variation of inter-arrival times,
- the indices of dispersion for intervals and counts, and
- the Hurst parameter for self-similar distributions.

Using the peak-to-mean ratio can be an efficient metric to calculate realtime. It may be computed by taking the ratio of the peak of a very short-term rate to a long-term average rate; comparing, for example, the peak of a 1-second EMA (over a 5-minute interval) with a 5-minute EMA.

The minimum and maximum EMA values for these various metrics allow symptoms (or abnormalities) to be flagged that are higher than normal (hyper) or lower than normal (hypo).

Affinity Profiling Metrics

In addition to rate profiling metrics, each crosspoint has affinity profiling metrics. Affinity represents the strength of correspondence between the crosspoint and another specific entity (called an "affinity point"). The affinity metric can be bit rate, bit rate*pkt rate (in order to allow both factors to positively influence the metric), or something else.

For each type of crosspoint, here are some, but not necessarily all, of the potential types of affinity points:

IDs:
  Other IDs (which IDs does an ID communicate with),
  Applications (which Apps does an ID use),
  Locations (the ID belongs to which locations), and
  Time Periods (the ID communicates during which particular time periods(s) of the day).
Applications:
  IDs (which IDs are using this application),
  Locations (this application is being run to/from which locations),
  Interfaces (the Interfaces on which this application is delivered/consumed), and
  Time Periods (the application is being used during which particular time period(s) of the day).
Locations:
  IDs (which IDs are the most active at this location),
  Applications (which applications are being run from this location),
  Interfaces (the Interfaces which are associated with this location), and
  Time Periods (the location is handling traffic at which particular times of the day).
Interfaces:
  IDs (which IDs are the most active on this interface),
  Applications (which applications are being run most heavily on this interface),
  Locations (which locations are most active on this interface), and
  Time Periods (the interfaces are active on which particular time periods).
Time Periods:
  IDs (which IDs are the most active during this time period),
  Applications (which applications are being run most heavily during this time period),
  Interfaces (which interfaces are most active during this time period), and
  Locations (which locations are most active during this time period).

Affinity Profile Using Long Term EMA

For each profile point, train by tracking the metric's long-term EMA for each affinity point. (A long-term EMA is one where past data is weighted more heavily, and thus the metric is smoother over time compared with a normal EMA.) After some amount of training time, save several affinity points that have the top long-term averages and disregard the rest; this set becomes the "affinity profile."

When comparing the current state with the affinity profile, when the current state is abnormal can be identified compared with the affinity profile, plus determine whether it's a "hypo" or "hyper" symptom. By summing the squared differences between the affinity profile and the current traffic, a metric of the overall amount of difference can be determined, which then can be compared against a threshold to determine whether it's significant enough to be "abnormal." If it is, then by summing across these top affinity points for both the affinity profile and the current traffic, it may be determined whether it is hyper or hypo.

Affinity Profile Using Normal EMA

For each profile point, train by tracking the metric's normal EMA for each affinity point, saving the max and min values. After some amount of training time, save several affinity points that have the top EMA values and disregard the rest; this set becomes the affinity profile. To compare the current state with the affinity profile, compare each affinity point's current value one-by-one with the affinity profile. If it is greater than the max or less than the min, then it gets flagged as a difference. It then can be determined whether the overall difference across all profile points is significant enough to become a symptom event.

Symptom Detection Mechanism

Once the profile is in place, the detection mechanism can be determined by testing each crosspoint once per second using both the basic tests and the complex tests. If one of the tests signals an abnormality (i.e., the current EMA is significantly less than the minimum threshold, significantly more than the maximum threshold, or significantly different than the histogram), then a flag can be set for that profile point. If the crosspoint continues to experience the abnormality for a specified period, then it can be declared a "symptom event" and interested processes can be notified.

For a hyper abnormality, the detection mechanism attempts to determine further information about the excessive activity: where it's primarily coming from (for an incoming abnormality) or going to (for an outgoing abnormality), which protocol was primarily involved, and which port was primarily involved. We obtain this information by monitoring the IP addresses, ports, and protocols for all packets corresponding to a profile point involved in a hyper abnormality.

The predominant IP address can be determined by updating an EMA value for each matching IP address in an IP address tree as packets arrive. Tree nodes corresponding to IP addresses that don't receive packets will be aged, and eventually pruned from the tree if their EMA value gets small enough. Nodes with significant EMA values will stay on the tree. Periodically the EMA values from the tree get sorted, and the top IP address can be determined. If the top address has a significantly higher EMA than the other addresses, then it can be considered a predominant address and can be reported in the notification.

The port and protocol can be found in a similar manner, but use arrays rather than trees. The EMA values corresponding to different ports and protocols get continually updated as packets arrive; they also periodically get aged, and possibly can be purged if their EMA value is small enough. Periodically the arrays can be sorted, and the top port and protocol emerge. If they have a significantly higher EMA than the others, then they will be reported in the notification.

The symptom event will continue until the profile point experiences a specified period without any abnormalities. Once this occurs, the symptom event can be deemed over.

Accounting for Sampling During Profiling and Detecting

There are generally three areas where sampling can be used in profiling or detecting:

The smoothing factor used during the calculations of the average packet inter-arrival time is typically 0.001, for example. However, if the sample rate is less than 1 in 5 (0.2), then the smoothing factor gets adjusted upward so that it is proportional to the inverse of the sampling rate. Otherwise, the smoothing factor may be too small and cause the EMA to rise too slowly due to the sampling and relatively low packet rates. If the sampling rate is really low (less than 1 in 5000), then the smoothing factor will be 1, which effectively means there is no smoothing.

When checking for hypo symptoms, a fixed number of bits or packets can be added to the current rate, then the result can be compared against the corresponding profile. When the sampling rate is less than 1, this fixed number of bits or packets can be first multiplied by the sampling rate.

Source or destination IP address tree pruning takes sampling into account so that nodes get pruned from the tree when their current EMA drops to less than the sampling rate. If there is an ongoing hyper symptom involving those nodes, then they won't be pruned until the symptom has expired.

Progressive Profiling

The profiling and detection mechanisms can operate in parallel. Periodically the profiling calculations can be updated as well as the detection calculations. If the detection mechanism indicates that an abnormality is present, then profiling can be temporarily stopped to avoid profiling on "bad" traffic patterns. As soon as the abnormality has ended, profiling resumes, beginning with the last saved good profile.

In order to declare an abnormality or symptom, the traffic levels may be a specified amount higher (than max), lower (than min), or different (than histograms). If the traffic levels are only slightly outside the previously observed ranges and not exceeding the specified amount, profiling continues without declaring an abnormality. This permits the profiles to adapt to naturally changing traffic environments. However, as soon as the differences are greater than the specified limit, profiling can be stopped and an abnormality can be declared.

After a specified amount of time has elapsed where the training profile for a crosspoint (known as the "emerging profile") has stabilized, the profile mechanism automatically updates the baseline profile used for detection (known as the "active profile"). It uses the emerging profile to update the active profile. This update calculation can be performed as an EMA calculation itself. The smoothing factor used for this profile update varies based on whether the emerging profile is trending higher or lower than the active profile. The upwards smoothing factor can be generally less than the downwards smoothing factor, allowing for quicker learning about new high traffic rates and slower "forgetting" about high traffic levels from the past.

Once the emerging profile has been used to update the active profile, the emerging profile cane be reset, and profile training can be restarted.

When a crosspoint is first created, its active profile is typically set to be accommodating: for example, its minimum threshold may be set to 0, its maximum may be set to a very high value, and its histogram bins may show a uniform distribution. This allows the crosspoint to initially see all of its traffic without initially declaring abnormalities.

The crosspoint's emerging profile is typically initialized in the opposite way: its maximum threshold may be set to 0 and its minimum threshold may be set to a very high value. As the crosspoint trains on traffic, this allows the maximum threshold to be able to decrease monotonically to its correct value, and the minimum threshold to be able to increase monotonically to its correct value. The histogram starts with a uniform distribution.

During the first auto-updating cycle, rather than using the exponential smoothing calculation, the active profile can be replaced with the emerging profile. Otherwise it could take a relatively long time for the active profile to converge to a reasonable set of values. For other auto-updating cycles, the EMA calculation may be used.

Retrospective Profiling

One possible alternative to progressive profiling is to profile based on historical data that is stored in the database, permitting additional analysis to be performed on the data during profiling, such as discarding a specified % of outliers. Possible steps for performing such "retrospective profiling" process include the following:

1. Obtain preferably all data from the database corresponding to the specified dates for the specified crosspoint. It can be helpful to independently analyze "working days" and "off days."
2. If certain time periods in the database don't contain any data, zero traffic can be assumed for those periods.
3. Any days that have symptoms preferably are ignored, unless the user specifically indicates that symptom data can be used for profiling.
4. The data is sorted.
5. If a specified percentage of outliers are to be discarded, those outliers are removed from the sorted dataset.
6. Profiles can be generated on the resulting data. These profiles can be max/min profiles, histogram profiles, or any other profile characterization.

Retrospective profiling preferably is done periodically (such as once a week) with the schedule being staggered for different measures of each crosspoint. Initially, there can be a blank current profile. When a new profile is computed, the new profile can replace the current profile (preferably instantly). Unlike progressive profiling, there is no notion of convergence of the emerging profile; rather, new profile when can be ready for immediate use as the current profile once computed.

Spectral Analysis of Crosspoint Historical Data

Figures 4, 5:
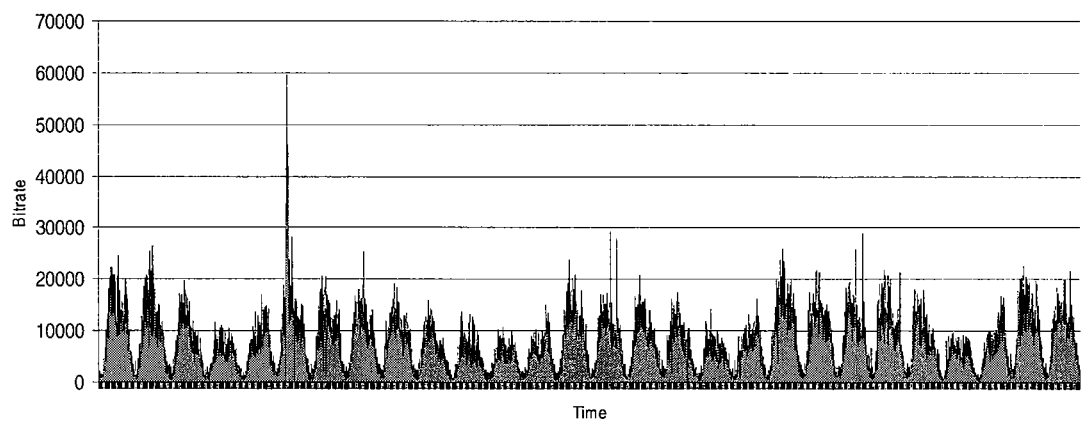
FIG. 4 shows an example of a crosspoint traffic data for four weeks.
FIG. 5 shows an example of a periodicity analysis of historical data.

Referring to FIGS. 4 and 5, many crosspoints' traffic patterns may vary based on the time of day and/or the day of the week. From a profiling standpoint, this periodicity may be captured so that symptom detection is generally more effective. The spectral analysis technique analyzes the traffic behavior for a particular cross-point and determines whether or not it shows daily or weekly periodicity. If so, then the profiling engine takes that into account and profile each day or day-of-week separately; if not, then there creation of separate profiles for different time intervals for that crosspoint may not be necessary.

Determining Crosspoint Periodicity

One technique for determining crosspoint periodicity includes the following steps:

Retrieve (preferably) all bitrate data from the database for a particular crosspoint for the past several weeks (for example four may be used in order to trust patterns in the data). For an example, see FIG. 4.

Divide the total time period into evenly spaced bins, where the total number of bins are a power of 2. For example, running for 4 weeks with 8192 bins results in each bin having a size of 295.3125 seconds. For each bin, all bitrate datapoints whose timestamp falls into that bin can be averaged.

Run a Fast Fourier Transform (FFT) on this data set. The result of the FFT is a set of complex numbers corresponding to the coefficients of sine and cosine waves for different frequencies that could be added together to reconstruct the original set of datapoints.

Find the magnitude of each complex coefficient by taking the square root of the sum of squares of the real and imaginary terms.

Sort the magnitudes to determine which frequencies are dominant, and interpret the results.

The zero frequency term typically is the most dominant, corresponding to a constant term that allows the average traffic level to be positive. If the next most dominant term corresponds to a daily frequency (28 in the 4-week example) or a weekly frequency (4 in the 4-week example), then the traffic exhibits periodicity (See FIG. 5).

Another technique for determining crosspoint periodicity includes the following steps:

Retrieve (preferably) all bitrate data from the database for a particular crosspoint for the past several weeks (for example four may be used in order to trust patterns in the data). For an example, see FIG. 4.

Divide the total time period into evenly spaced bins, where the total number of bins are a power of 2. For example, running for 4 weeks with 8192 bins results in each bin having a size of 295.3125 seconds. For each bin, all bitrate datapoints whose timestamp falls into that bin can be averaged.

Run a series of pair-wise correlations among the various days' data. For each pair of days, first run a correlation where the times are properly aligned (e.g., 1 a.m. Monday correlating with 1 a.m. Tuesday). Then run correlations where the times are out of alignment by one hour (e.g., 1 a.m. Monday correlating with 2 a.m. Tuesday), then by two hours (e.g., 1 a.m. Monday correlating with 3 a.m. Tuesday, etc.), and so on.

Average the aligned correlations, then average the correlations representing a shift by 1 hour, then average the correlations representing a shift by 2 hours, and so on. This results in a set of 24 average correlation values.

Analyze these average correlation values. For the endpoint to be periodic, the average aligned correlation must be very high, and it must be significantly higher than the shifted average correlation data.

Profiling Periodic Crosspoints

If a crosspoint exhibits periodicity, then it can be profiled accordingly. For crosspoints with a dominant weekly periodicity, each time period can be independently profiled for a week.

For crosspoints with a dominant daily periodicity and a dominant weekly periodicity, each time period can be profiled for a week.

For crosspoints with a dominant daily periodicity but no dominant weekly term, each time period can be profiled for a day.

And for crosspoints without dominant daily or weekly periodicity terms, time-based profiling for a crosspoint is generally not done.

One technique for profiling a crosspoint the exhibits daily periodicity includes the following steps:

Run a Fast Fourier Transform (FFT) on the data set. The result of the FFT is a set of complex numbers corresponding to the coefficients of sine and cosine waves for different frequencies that could be added together to reconstruct the original set of datapoints.

Find the magnitude of each complex coefficient by taking the square root of the sum of squares of the real and imaginary terms.

Sort the magnitudes to determine which frequencies are dominant. Remove (preferably) all frequency terms except for the top few frequencies.

Run an inverse FFT on these remaining terms. The result is a smoothed version of the original time domain data set.

Bin the data into hourly increments, and determine the max and the min for each hour across all days. For example,
find the max and min for the 0:00-1:00 hour across all days, then find the max and min for the 1:00-2:00 hour across all days, and so on. This results in a traffic envelope that varies hour-by-hour for a full day.

Determine how well the original database data fits within this envelope. If more than a specified outlier percentage of the original data falls outside the envelope, then slowly increase the envelope size until the specified outlier percentage is maintained.

The result should be a profile defined by max and min values, varying hour by hour, that has at most a specified outlier percentage.

Multidimensional Crosspoint Profiling

Combinations of four crosspoint types (IDs, Applications, Locations, and Time Periods) may also be profiled, thus gaining a finer crosspoint granularity for profiling and detection and may include the following combinations of two, three, or four crosspoint types:

IDxApplication: profile each application running on each endpoint

IDxLocation: profile each endpoint's behavior at each location

IDxInterface: profile each endpoint's behavior at each interface

IDxTime Period: profile each endpoint's behavior at various points in time

ApplicationxLocation: profile each application running at each location

ApplicationxInterface: profile each application using each interface

ApplicationxTime Period: profile each application running at various points in time LocationxInterface: profile each interface associated with each location LocationxTime Period: profile traffic behavior at each location for various points in time InterfacexTime Period: profile traffic behavior at each interface for various points in time IDxApplicationxTime Period: profile applications being run by each endpoint at various points in time IDxLocationxTime Period: profile endpoints' traffic behavior at various locations for various points in time IDxApplicationxLocation: profile applications being run by each endpoint at various locations IDxApplicationxInterface: profile applications being run by each endpoint at various interfaces IDxLocationxInterface: profile endpoints' traffic behavior at various locations using various interfaces IDxInterfacexTime Period: profile endpoints' traffic behavior using each interface at various points in time ApplicationxLocationxTime Period: profile applications being run at various locations for various points in time ApplicationxLocationxInterface: profile applications being run at various locations using each interface ApplicationxInterfacexTime Period: profile applications being run at each interface for various points in time LocationxInterfacexTime Period: profile each interface at each location for various points in time IDxApplicationxLocationxTime Period: profile applications being run by each endpoint at various locations for various points in time IDxApplicationxLocationxInterface: profile applications being run by each endpoint at various locations across various interfaces IDxApplicationxInterfacexTime Period: profile applications being run by each endpoint across various interfaces at various points in time ID×Location×Interface×Time Period: profile endpoints' traffic behavior using each location for various interfaces at various points in time Application×Location×Interface×Time Period: profile applications being run from each location across various interfaces at various points in time ID×Application×Location×Interface×Time Period: profile applications being run by each endpoint from each location across various interfaces at various points in time.

For example, by profiling combinations of ID×Application, expected behavior may be determined, and symptoms flagged at a finer granularity. This in turn may allow the correlation engine to more easily hone in on the problem.

Note that each crosspoint may have several measures associated with it including the rate measures of packet rate, bit rate, burstiness, and interaction rate (with other crosspoints) as well as an affinity measure with other crosspoints.

Note that Time Period may not be applicable if the Spectral Analysis results indicate that the crosspoint is not dependent upon time. In those cases, the combinations would typically not be profiled.

Histogram-Based Representation

The profiling and detection engines can utilize histograms to augment the minimum/maximum thresholds. These histograms preferably are calculated for the same metrics as the thresholds: bitrate, packetrate, burstiness, and interaction rate. The histograms may be constructed as follows:

The overall potential range of each traffic metric may be predetermined based on the metric. This overall range can then be segmented into several smaller bins for the histogram. The bins can be constructed with a log scale so that the lower bins have finer granularity, and the higher bins have coarser granularity. The highest bin typically includes all data points greater than some value; the lowest bin typically has a lower bound of 0.

Each bin holds its ongoing EMA statistics (which get updated periodically, say every N minutes), plus its count for the current period.

At the end of a time period such as every second, the counts can be updated for the past interval. Each metric falls into a particular bin, so the count for that bin can be incremented.

At the end of N minutes, for example, there will be N×60 data points collected into the histogram bins (for a time period of one second). The relative frequency can be calculated for each bin for those N×60 points.

Those relative frequencies can then be used to perform an EMA calculation to update the EMA statistics for each histogram bin.

Each bin thus has its own EMA calculations, providing ongoing relative frequencies for each metric. The result can be a histogram reflecting the distribution of the metrics over time.

Symptom Detection Using Distribution-Based Probability Analysis

As with the minimum and maximum thresholds, the profiling and detection engines may maintain two sets of histograms for each crosspoint: one for training (the "emerging profile") and one for detecting (the "active profile"), for example.

The active profile's histograms may be used for detection as follows:

As described previously, the overall range for each traffic metric can be segmented into several smaller bins. Each bin holds its EMA statistics, which get updated every N minutes, plus its counts for the current period. Counts can be incremented every second based on the metric value during the past one second interval, for example.

At the end of N minutes, we calculate the relative frequency for each bin for the N×60 data points. Before using this relative frequency to update the EMA statistics for each bin, these relative frequencies and the baselined active profile histogram can be compared.

The deviation of the current relative frequency from the active threshold can be calculated using the sum of squared differences across all bins. When this deviation is greater than a predetermined threshold for a pre-determined number of periods, then a symptom can be declared.

Once a symptom is declared, the detection engine preferably determines the type of symptom. The symptom could be:

Hyper: the current relative frequency for the higher bins is greater than those of the higher bins for the active threshold;

Hypo: the current relative frequency for the lower bins is greater than those of the lower bins for the active threshold; or Sundry: there is no dominant hyper or hypo trend, but there still is a significant deviation in the distribution.

ALTERNATIVE EMBODIMENTS

After reading this application, those skilled in the art will recognize that the invention has wide applicability, and is not limited to the embodiments described herein. It is to be understood that while certain forms of this invention have been illustrated and described, it is not limited thereto, except in so far as such limitations are included in the following claims and allowable equivalents thereof.

The invention claimed is:

1. A method, including steps of maintaining, at a network monitoring device, information regarding long-term historical activity of a network;

maintaining information regarding short-term activity of that network;

receiving information regarding recent activity of that network;

comparing that information regarding recent activity with that information regarding long-term activity, and determining the presence of abnormal activity in response to a result of said steps of comparing recent with long-term activity;

comparing that information regarding recent activity with that information regarding short-term activity, determining the presence of changes in network activity in response to a result of said steps of comparing recent with short-term activity, and updating that short-term activity if and only if that information regarding recent activity is within normal behavior for that network;

comparing that information regarding short-term activity with that information regarding long-term activity, and determining the presence of changes in network activity in response to a result of said steps of comparing short-term with long-term activity, and updating that long-term activity using that recent activity if and only if that information regarding recent activity is within normal behavior for that network.

2. A method as in claim 1, including steps of determining that said recent activity is within normal behavior for that network only when said recent activity is within a selected range of difference from that long-term activity.

3. A method as in claim 1, including steps of
maintaining a first set of information about that short-term activity, without updating that first set of information for a selected period of time;
maintaining a second set of information about that short-term activity, while updating that second set of information promptly upon those steps of receiving information about recent activity;
wherein that first set of information about short-term activity and that second set of information about short-term activity differ by whether that information about recent activity is used; and
replacing that first set of information with that second set of information if and only if that information about recent activity indicates recent activity that is within normal behavior for that network.

4. A method as in claim 3, wherein
that first set of information indicates a last-known-good set of information about emergent activity of that network, and that second set of information includes an in-construction set of information about emergent activity of that network; and
at a time for updating that long-term activity, using that last-known-good set of information if and only if that recent activity is not within normal behavior for that network, and using that in-construction set of information if and only if that in-construction set of information indicates that recent activity is within normal behavior for that network.

5. A method, including steps of
maintaining, at a network monitoring device, information regarding historical activity of a network;
maintaining information regarding emergent activity of that network;
comparing recent network activity to a predetermined parameter and the emergent activity, and determining the presence of changes in network activity in response to a result of said steps of comparing;
also comparing recent network activity to the historical activity, and also determining the presence of abnormal activity in response to said steps of also comparing;
if and only if said steps of also comparing recent network activity to the historical activity indicate lack of abnormal activity, adjusting that information regarding emergent activity of that network in response to the comparing; and
if and only if said steps of also comparing recent network activity to the historical activity indicate lack of abnormal activity, adjusting that information regarding historical activity of that network in response to that information regarding emergent activity of that network.

6. A method as in claim 4, including steps of
waiting a selected period of time after using that last-known-good set of information before starting to start a next in-construction set of information.

7. A method as in claim 5, wherein those steps of maintaining information regarding historical activity of that network are responsive to a relatively long-term review of network behavior.

8. A method as in claim 5, including steps of
pausing those steps of adjusting that information regarding emergent activity of that network in response to a result of the steps of also comparing and also determining.

9. A method as in claim 8, wherein those steps of also determining are responsive to whether that recent activity includes observable values too high or too low for consistency with historical activity of the network.

10. A method as in claim 8, wherein those steps of also determining are responsive to whether that recent activity includes observable values too unlikely for consistency with historical activity of the network.

11. A method as in claim 5,
wherein those steps of adjusting that information regarding historical activity of that network in response to that information regarding emergent activity of that network include steps of adaptively modifying that information regarding historical activity of that network in response to that information regarding emergent activity of that network.

12. A method as in claim 11, wherein the steps of adaptively modifying include an adaptive modification parameter $\Lambda$ having a value between approximately 0.5 and 1.0.

13. A method, including steps of
maintaining, at a network monitoring device, information regarding relatively long-term historical activity of a network;
maintaining information regarding short-term activity of said network;
receiving a value indicative of recent network activity;
comparing said recent network activity to said short-term activity and a predetermined threshold value, determining the presence of changes in network activity in response to said steps of comparing recent activity with short-term activity;
comparing said recent network activity to said long-term activity, and determining the presence of abnormal activity in response to said steps of comparing recent activity with long-term activity;
maintaining a history of the values in response to the steps of comparing recent activity with long-term activity;
if and only if said steps of determining the presence of abnormal activity indicate lack of abnormal activity, adjusting that information regarding the long-term historical activity of a network in response to said short-term activity of that network; and
determining information regarding time-dependent activity of that network in response to that information regarding long-term historical activity of that network.

14. A method as in claim 13, wherein those steps of determining the presence of changes in network activity include spectral analysis.

15. A method as in claim 13, wherein those steps of determining the presence of changes in network activity include interpreting a result of a Fast Fourier Transform.

16. A method as in claim 15, wherein those steps of interpreting include determining a magnitude for each frequency result of the Fast Fourier Transform and sorting the magnitudes in rank order.

17. A method as in claim 16, wherein those steps of sorting include determining if there are other frequencies for which the magnitude of the frequency coefficient is substantial.

18. A method as in claim 17, wherein those steps of determining if there are other frequencies include determining if there is periodicity to the magnitudes.

19. The method of claim 1 further including the steps of:
when said steps of determining the presence of abnormal activity indicate lack of abnormal activity,
replacing a portion of the long-term activity with the short-term activity, and
replacing the short-term activity with the recent network activity.

20. The method of claim 5 wherein the predetermined parameter is a threshold indicating deviation from an acceptable value.

21. The method of claim 13 wherein the threshold value is a threshold indicating allowable deviation from an acceptable value.

22. A method as in claim 5, including steps of when said steps of also comparing and also determining indicate abnormal activity, refraining from adjusting that information regarding emergent activity of that network in response to the comparing; and when said steps of also comparing and also determining indicate abnormal activity, refraining from adjusting that information regarding historical activity of that network in response to that information regarding emergent activity of that network.

\* \* \* \* \*